(12) United States Patent
Centonza et al.

(10) Patent No.: US 11,418,967 B2
(45) Date of Patent: Aug. 16, 2022

(54) METHOD FOR INTER-RADIO ACCESS TECHNOLOGY RESOURCE SHARING

(71) Applicant: TELEFONAKTIEBOLAGET LM ERICSSON (PUBL), Stockholm (SE)

(72) Inventors: Angelo Centonza, Stockholm (SE); Filip Barac, Huddinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 68 days.

(21) Appl. No.: 16/963,238

(22) PCT Filed: Jan. 23, 2019

(86) PCT No.: PCT/IB2019/050576
§ 371 (c)(1),
(2) Date: Jul. 19, 2020

(87) PCT Pub. No.: WO2019/145878
PCT Pub. Date: Aug. 1, 2019

(65) Prior Publication Data
US 2021/0385661 A1    Dec. 9, 2021

Related U.S. Application Data

(60) Provisional application No. 62/620,974, filed on Jan. 23, 2018.

(51) Int. Cl.
*H04W 4/00*       (2018.01)
*H04W 16/14*     (2009.01)
*H04W 48/16*     (2009.01)

(52) U.S. Cl.
CPC ........... *H04W 16/14* (2013.01); *H04W 48/16* (2013.01)

(58) Field of Classification Search
CPC .............................. H04W 16/14; H04W 48/16
USPC ........................................................ 370/329
See application file for complete search history.

(56) References Cited

U.S. PATENT DOCUMENTS

| | | |
|---|---|---|
| 2015/0237645 A1 | 8/2015 | Andrianov et al. |
| 2016/0088638 A9* | 3/2016 | Damnjanovic ....... H04L 1/0026 455/452.1 |
| 2016/0338098 A1 | 11/2016 | Li et al. |
| 2018/0007495 A1* | 1/2018 | Martin .............. H04W 72/0413 |

(Continued)

OTHER PUBLICATIONS

Iaesi, et al., Central RRM functionality, R3-172826, 3GPP TSG-RAN WG3 Meeting #97, Berlin, Germany, Aug. 21-25, 2017.

(Continued)

*Primary Examiner* — Temica M Beamer

(57) ABSTRACT

A method for resource sharing comprises receiving, from a first network node adapting a first radio access technology (RAT), a resource coordination message which indicates a first cell served by the first network node; coordinating, at a second network node adapting a second RAT, at least one resource allocation for at least one second cell served by the second network node based on the resource coordination message; aggregating, at the second network node, the at least one resource allocation into a resource allocation message; and forwarding, to the first network node, the resource allocation message. The method provides a central unit of a network node to perform a resource coordination between the network nodes adapting different RAT.

23 Claims, 16 Drawing Sheets

(56) References Cited

U.S. PATENT DOCUMENTS

2018/0007625 A1* 1/2018 Yu .................... H04W 48/12
2018/0014218 A1* 1/2018 Kubota ............... H04W 56/001

OTHER PUBLICATIONS

Ericsson, LTE-NR radio resource allocation coordination, R3-180435, 3GPP TSG RAN WG3 NR AdHoc 1801, Sophia Antipolis, France, Jan. 22-26, 2018.

\* cited by examiner

METHOD FOR INTER-RADIO ACCESS TECHNOLOGY RESOURCE SHARING

This application is a 371 of International Application No. PCT/IB2019/050576, filed Jan. 23, 2019, which claims the benefit of U.S. Provisional Application No. 62/6920,984, filed Jan. 23, 2018, the disclosures of which are fully incorporated herein by reference.

TECHNICAL FIELD

Particular embodiments relate to the field of resource sharing; and more specifically, to methods, apparatus and systems for inter-RAT resource sharing.

BACKGROUND

Currently, the 5G radio access network (RAN) architecture comprises a set of gNBs connected to the 5G core network (5GC) through the NG interface. FIG. 1 illustrates the current 5G RAN architecture described in TS38.401. The characteristics of the NG architecture are further described as follows: (1) the NG-RAN consists of a set of gNBs connected to the 5GC through the NG; (2) a gNB may support Frequency Division Duplex (FDD) mode, Time Division Duplex (TDD) mode, or dual mode operation; (3) gNBs may be interconnected through the Xn; (4) a gNB may consist of a gNB-central unit (CU) and gNB-distributed units (DUs); (5) a gNB-CU and a gNB-DU are connected via F1 logical interface; and (6) one gNB-DU is connected to only one gNB-CU.

NG, Xn and F1 are logical interfaces. For NG-RAN, the NG and Xn-C interfaces for a gNB, which consists of a gNB-CU and gNB-DUs, terminate in the gNB-CU. For E-UTRAN New Radio-Dual Connectivity (EN-DC), the S1-U and X2-C interfaces for a gNB, which consists of a gNB-CU and gNB-DUs, terminate in the gNB-CU. The gNB-CU and the connected gNB-DUs are only visible to other gNBs and the 5GC as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1), the related TNL protocol and the functionality are specified. The TNL provides services for user plane transport and signaling transport. In NG-Flex configuration, each gNB is connected to all AMFs within an AMF Region. The AMF Region is defined in 3GPP TS 23.501.

In future deployments, base stations of two different radio access technologies (RATs) may be deployed in shared spectrum scenarios, transmitting over fully or partially overlapping frequency bands, where the coverage areas of the two base stations (i.e. RATs) may fully or partially overlap. Base stations sharing the resources as well as base stations in general may have different internal logical structures. Taking 5G RAN as a non-limiting example, a base station may be monolithic. For example, a gNB is monolithic as illustrated on the left-hand side of FIG. 1. In another example, a base station may consist of a CU and DU(s), which are not co-located and are connected via a logical interface, for example, the F1 interface in 5G RAN as shown on the right-hand side of FIG. 1. In the case of 5G RAN, one DU may be connected to only one CU, whereas one CU may be connected to multiple DUs.

FIG. 2 illustrates the LTE downlink physical resource, where a subcarrier spacing is 15 kHz. Regarding LTE and NR physical layer, the physical layer transmission in LTE and NR uses orthogonal frequency-division multiplexing (OFDM) in the downlink. While LTE always uses discrete Fourier transform (DFT)-spread OFDM in the uplink, it may be configurable to either OFDM or DFT-spread OFDM for NR. The basic LTE and NR physical resource may thus be seen as a time-frequency grid as illustrated in FIG. 2, where each resource element corresponds to one subcarrier during one OFDM symbol interval.

FIG. 3 illustrates a LTE time-domain frame structure. In the time domain, LTE downlink transmissions are organized into radio frames of 10 ms, and each radio frame consists of ten equally-sized subframes of 1 ms as illustrated in FIG. 3. A subframe is divided into two slots, each of the slots is 0.5 ms time duration.

The resource allocation in LTE is described in terms of resource blocks (RBs), where an RB corresponds to one slot in the time domain and 12 contiguous 15-kHz subcarriers in the frequency domain. Two in time consecutive RBs represent an RB pair or physical resource block (PRB) and correspond to the time interval upon which scheduling operates.

FIG. 4 illustrates a NR time-domain structure. In the time domain, NR downlink transmissions are organized into radio frames of 10 ms, and each radio frame consists of ten equally-sized subframes of 1 ms as illustrated in FIG. 4. A subframe is divided into 1, 2, 4, 8 or 16 slots, each of the slots is a configurable time duration.

The resource allocation in NR is described in terms of RBs, where an RB corresponds to one slot in the time domain and 12 contiguous subcarriers in the frequency domain, and where the subcarrier bandwidth is configurable.

In NR, the bandwidth for which a UE is served may be UE specific. Therefore, two UEs which has capabilities to receive different maximum bandwidths may still be served by the same carrier band. The term bandwidth part (BWP) is introduced, which is the part of the bandwidth where the UE currently is served. For example, the carrier may have 100 MHz bandwidth but a less complex UE only operate on a 15 MHz BWP while another UE use the full 100 MHz BWP. It is also possible that a given UE is configured a narrow BWP, e.g. 15 MHz, and a wide BWP, e.g. 100 MHz, simultaneously, while only one of its configured BWPs is active at a time. This allows the UE to save battery when there is no need for a large data transfer, but it may quickly switch to a large BWP if there is need to transmit or receive a lot of data.

NR is based on an OFDM waveform. But compared to LTE which use a fixed subcarrier spacing of 15 kHz and 1 ms long subframes, a scaled numerology is introduced, where a parameter µ is used to set the subcarrier spacing $\Delta f = 2^\mu \cdot 15$ [kHz] for a given bandwidth part. Table 1 below shows the supported subcarrier spacings in NR Release-14.

TABLE 1

Supported transmission numerologies and subcarrier spacing $\Delta f$

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

When the subcarrier spacing is increased, then the OFDM symbol time is decreased proportionally.

In LTE, a subframe is 1 ms long and is used to transmit a Physical Downlink Shared Channel (PDSCH) or Physical Uplink Shared Channel (PUSCH), i.e. this is the Transmission Time Interval (TTI) for a data transport block, while the corresponding measure in NR is a slot which scales with the numerology $\mu$. Hence the OFDM slot time is $T=2^{-\mu} \cdot 1$ [ms], and the number of symbols per slot is given by Table 2.

TABLE 2

Number of OFDM symbols per slot, slots per frame, and slots per subframe for normal cyclic prefix

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In Table 2, it may also be seen that a frame has 10 slots when $\mu=0$, that is when the subcarrier spacing is 15 kHz, same as a frame in LTE has 10 subframes, but for $\mu=3$, when the subcarrier spacing is 120 kHz according to Table 1, then there are 80 slots per frame, i.e. per 10 ms. In a sense, a slot in NR is equivalent to a subframe in LTE. However, NR also has subframes, which is always 1 ms, irrespectively of the numerology. But a subframe does not have any particular relevance in NR physical layer except it serves as a "clock", once per 1 ms, but it may be useful for higher layer configurations. In addition, NR has frames, which is always 10 ms.

To summarize, the frame and subframe always have fixed time durations which are 10 ms and 1 ms, while slots have a time duration that depends on the numerology according to $T=2^{-\mu} \cdot 1$ [ms].

Moreover, NR will support a larger maximum carrier or BWP bandwidth compared to LTE, partially achieved by changing the subcarrier spacing to be larger than 15 kHz, but partially also to due to the fact that a larger total number of subcarriers may be used, up to 3300 subcarriers is supported in NR. This means that a carrier can have up to 275 physical resource blocks each comprising 12 subcarriers.

For each numerology and carrier, a resource grid of $N_{RB,x}^{\mu} N_{sc}^{RB}$ subcarriers and $N_{symb}^{subframe,\mu}$ OFDM symbols are defined, where $N_{RB,x}^{max,\mu}$ is given by Table 3 and x is DL or UL for downlink and uplink, respectively. Note that there is also a minimum bandwidth due to the fact that synchronization signals need to be transmitted and they have 20 RB bandwidth.

TABLE 3

Minimum and maximum number of resource blocks.

| $\mu$ | $N_{RB, DL}^{min, \mu}$ | $N_{RB, DL}^{max, \mu}$ | $N_{RB, UL}^{min, \mu}$ | $N_{RB, UL}^{max, \mu}$ |
|---|---|---|---|---|
| 0 | 20 | 275 | 20 | 275 |
| 1 | 20 | 275 | 20 | 275 |
| 2 | 20 | 275 | 20 | 275 |
| 3 | 20 | 275 | 20 | 275 |
| 4 | 20 | 138 | 20 | 138 |

A user may now compute the maximum number or RB per radio frame by using the Tables 2 and 3 and assuming the maximal bandwidth of 275 RB. For example, if $\mu=0$, then there are 10*275=2750 RB per radio frame, while if $\mu=3$, then there are maximally 80*275=22000 RB per radio frame.

As of today, there are no existing solutions for inter-RAT radio resource sharing. Furthermore, the internal logical structure of participating base stations is not being considered in the spectrum sharing solution design.

SUMMARY

To address the foregoing problems with existing solutions, disclosed are methods, network nodes, and systems for inter-RAT resource sharing by coordinating resource allocation for the network nodes adapting different RAT. The present disclosure implements a solution to have a central unit (CU) of the network node to coordinate the resources used by the network node adapting LTE and the resources used by distributed units of the network node adapting NR. In addition, the CU may aggregate the resource allocations received from the distributed units of the network node into one single message, and send the message to another network node using a resource overlapping with or adjacent to a resource used by other network node.

Several embodiments are described in this disclosure. According to one embodiment, a method for resource sharing comprises receiving, from a first network node adapting a first radio access technology (RAT), a resource coordination message which indicates a first cell served by the first network node. The method additionally comprises coordinating, at a second network node adapting a second RAT, at least one resource allocation for at least one second cell served by the second network node based on the resource coordination message. The method further comprises aggregating, at the second network node, the at least one resource allocation with at least one additional resource allocation associated with at least one additional cell into a resource allocation message. The method further comprises forwarding, to the first network node, the resource allocation message. The resource allocation message comprises an identity of the second cell and the at least one additional cell and the corresponding resource allocations for the second cell and the at least one additional cell.

In one embodiment, the first RAT is Long Term Evolution (LTE) and the second RAT is New Radio (NR). In one embodiment, the first and second RATs are NR. In one embodiment, the first and second network nodes comprise a central unit (CU) and at least one distributed unit (DU) coupled to the CU.

In one embodiment, the coordinating further comprises identifying, at the CU of the second network node, a need to coordinate resources between the first cell, the at least one second cell, and the at least one additional cell, and deducing, at the CU of the second network node, neighbor relations between the first cell, the at least one second cells, and the at least one additional cell. The coordinating also includes detecting, at the CU of the second network node, a neighboring cell which corresponds to the first cell from the at least one second cell and the at least one additional cell; identifying, at the CU of the second network node, at least one DU in the neighboring cell; and forwarding, from the CU to the at least one DU in the neighboring cell, the resource coordination message. The coordinating also includes calculating, at the at least one DU in the neighboring cell, the at least one resource allocation based on the resource coordination message and receiving, from the at least one DU in the neighboring cell at the CU, the at least one resource allocation. In one embodiment, the neighbor relations are previous neighbor relations configured at the second network node or are gained by UE measurements.

In one embodiment, the resource coordination message indicates that the first cell shares at least one resource with the at least one second cell or the at least one additional cell. In one embodiment, the resource coordination message indicates that the first cell uses at least one resource which is adjacent to at least one resource used by the at least one second cell or the at least one additional cell.

In one embodiment, the resource coordination message and the resource allocation message are represented as a bitmap, wherein each bit in the bitmap corresponds to a time-frequency resource.

In one embodiment, the resource allocation and/or the additional resource allocation indicate(s) a configuration for serving a user equipment (UE) served by the second network node.

In one embodiment, the method further comprises receiving, from the first network node at the second network node, a modification message indicating a modified resource allocation at the first cell.

In one embodiment, the method further comprises determining, at the second network node, whether any of the at least one second cell and the at least one additional cell at the second network node is a direct neighbor cell to the first cell, and partitioning, at the second network node, resources used by the second network node if any of the at least one second cell and the at least one additional cell at the second network is the direct neighbor cell to the first cell.

According to another embodiment, a network node for resource sharing comprises at least one processing circuitry, and at least one storage that stores processor-executable instructions, that when executed by the processing circuitry, causes a network node adapting a first RAT to receive, from a first network node adapting a second RAT, a resource coordination message which indicates a first cell served by the first network node; coordinate at least one resource allocation for at least one second cell served by the network node based on the resource coordination message; aggregate the at least one resource allocation with at least one additional resource allocation associated with at least one additional cell into a resource allocation message; and forward, to the first network node, the resource allocation message which comprises an identity of the second cell and the at least one additional cell and the corresponding resource allocations for the second cell and the at least one additional cell.

According to yet another embodiment, a communication system for resource sharing, the communication system comprises a first network node and a second network node. The first network node adapting a first RAT comprises at least one processing circuitry configured to send, to a second network node, a resource coordination message which indicates a first cell served by the first network node. The second network node adapting a second RAT comprises at least one processing circuitry configured to receive, from the first network node, the resource coordination message, coordinate at least one resource allocation for at least one second cell served by the second network node based on the resource coordination message, aggregate the at least one resource allocation with at least one additional resource allocation associated with at least one additional cell into a resource allocation message, and forward, to the first network node, the resource allocation message which comprises an identity of the second cell and the at least one additional cell and the corresponding resource allocations for the second cell and the at least one additional cell. The first network node is further configured to receive, from the second network node, the resource allocation message, identify at least one resource being allocated by the second network node based on the resource allocation message, modify a resource allocation at the first cell based on the at least one resource being allocated by the second network node, and send, to the second network node, a modification message indicating a modification of the resource allocation at the first cell.

Certain embodiments may provide one or more of the following technical advantage(s). The methods disclosed in the present disclosure may allow an effective exchange of resource allocation information from a neighbor network node adapting a RAT to a number of distributed units of a network node adapting a different RAT than the neighbor network node. Another advantage is that the methods provide a central unit of the network node the ability to coordinate the resource allocations for a neighbor network node and the distributed units coupled to the central unit to avoid potential interferences to a user equipment in the cells served by the above network nodes.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DESCRIPTION OF EMBODIMENTS

Figure 1:
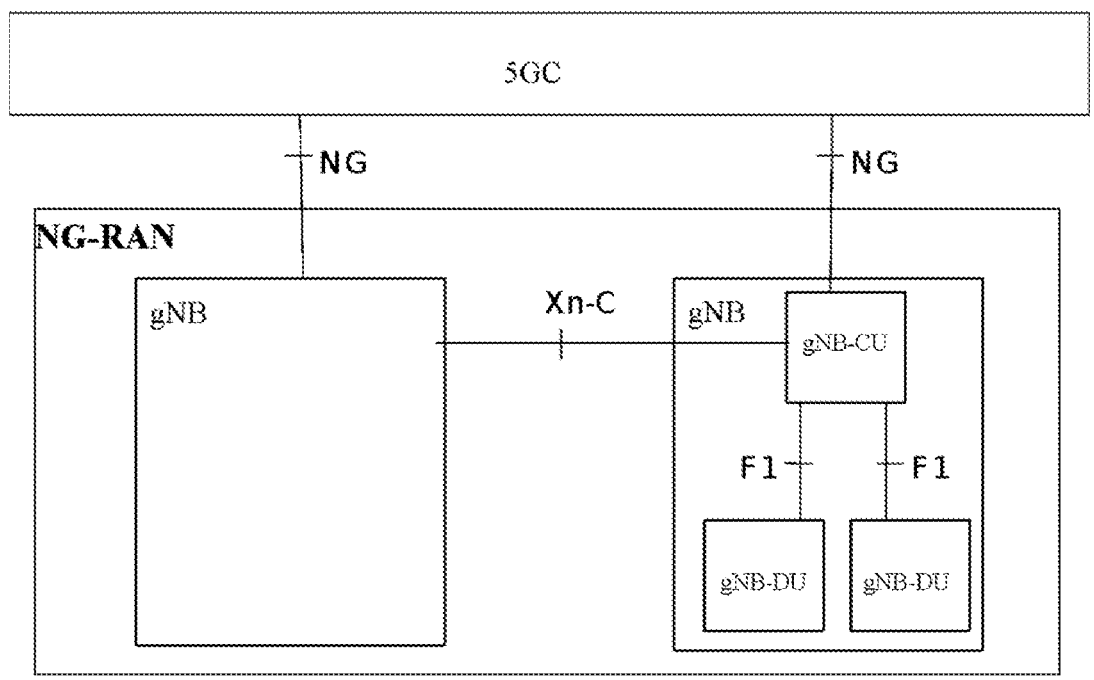
FIG. 1 illustrates an example 5G RAN overall architecture.
Figure 2:
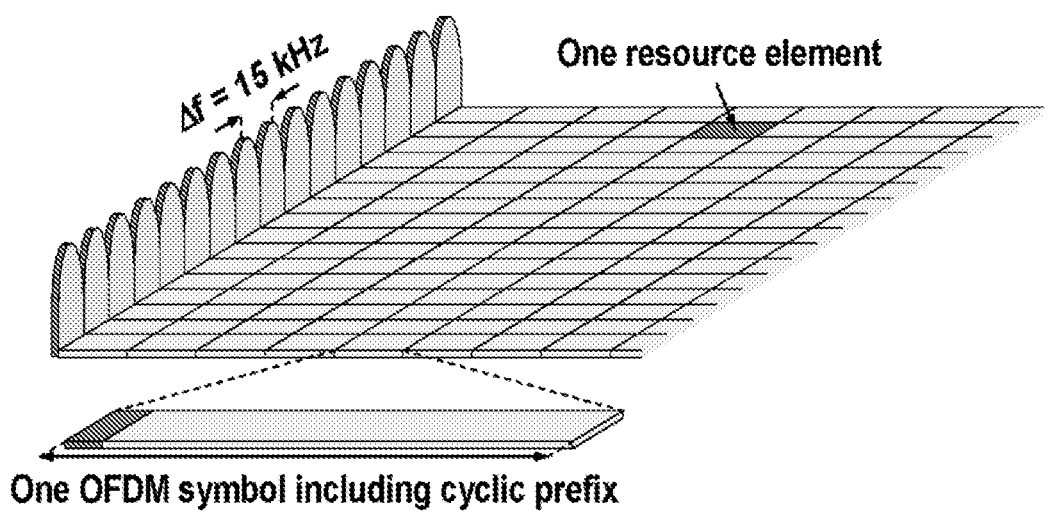
FIG. 2 illustrates an example LTE downlink physical resource.
Figure 3:
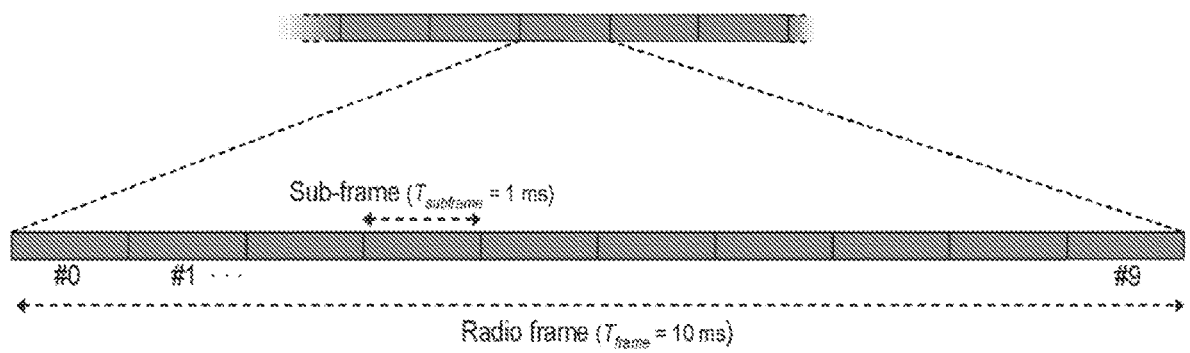
FIG. 3 illustrates an example LTE time-domain frame structure.
Figure 4:
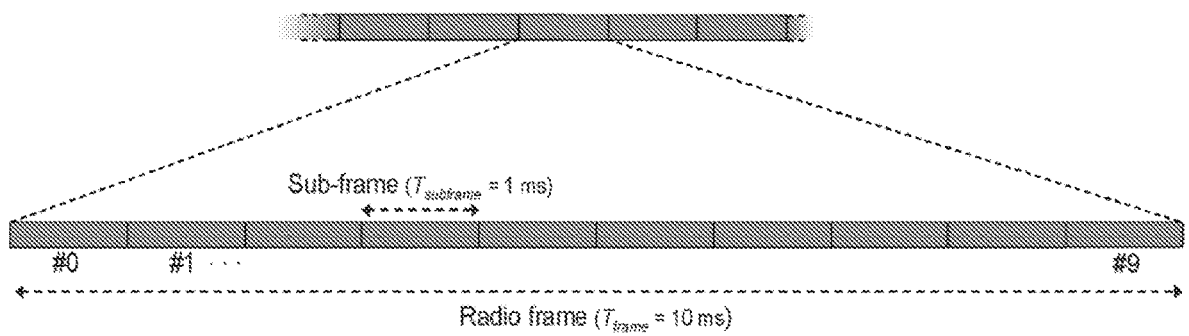
FIG. 4 illustrates an example NR time-domain frame structure.

Particular embodiments of the present disclosure propose a method to coordinate resource allocation between network nodes adapting different RATs. Particular embodiments provide a central unit (CU) in the network node which receives a resource coordination message from a neighbor network node adapting different RAT than the network node with the central unit, aggregates multiple resource allocations received from distributed units (DUs) coupled to the central unit into one single resource allocation message, and sends the resource allocation message back to the neighbor network node. Therefore, the neighbor network node may either maintain or modify its resource allocation to avoid utilizing the same resource with the DUs at the same time. In addition, the CU disclosed in the present disclosure may further partition resources when the CU realizes that more than one DU intends to use the same resource upon receiving the resource allocations from the DUs.

Particular embodiments illustrate an inter-RAT spectrum sharing in the CU-DU base station architecture, where a CU is connected to a number of DUs via a logical interface. For a non-limiting example, the CU may be a 5G RAN gNB-CU, and the DU may be a gNB-DU. In particular embodiments, a base station consisting of a CU and a number of attached DUs may be referred to as a distributed base station (DBS).

The methods disclosed in the present disclosure consist of a gNB-CU receiving radio resource allocation information from a neighbor RAT node and determining which of its connected DUs serves cells that are neighbors of the cell for which the neighbor RAT node signaled radio resource allocation information. Upon determining such list of connected DUs, the CU forwards the neighbor network node resource information and receives back from each DU a corresponding resource allocation configuration. In particular embodiments, such resource allocation configuration may be as much as possible not overlapping with the one sent by the neighbor RAT node. The CU then aggregates the resource allocation from each DU into one group of allocated resources and sends it back to the neighbor RAT node. Such exchange of aggregated radio resource allocation facilitates resource coordination in scenarios where different cells in different network nodes share spectrum or use adjacent spectrum.

In particular embodiments, the coverage areas of DUs under the same CU may fully or partially overlap the coverage area of a base station of another RAT, e.g. a neighbor base station (NBS). A neighbor base station may be monolithic or distributed as well, where LTE eNB is a non-limiting example of the former. In particular embodiments, it will be assumed that the base station having distributed architecture is an NR gNB, consisting of a gNB-CU and a number of gNB-DUs, while the NBS is a monolithic LTE eNB. This does not preclude the validity of the present disclosure for any other combinations of different or same RATs. Furthermore, the assumption does not preclude the validity of the methods disclosed in the present disclosure for the case when the NBS is a distributed base station.

The root cause for radio resource sharing is the physical proximity of the participating nodes utilizing overlapping radio resources, and the consequent overlap of their coverage areas. In the one-to-many CU-DU relation where the DUs attached to a CU may be distributed over a wide geographical area, it is possible that not all DUs connected to a CU will have coverage overlaps with the NBS with which radio resources are shared. Furthermore, the exact resource allocations between DUs connected to the same CU may vary. In addition to the resources shared with a base station of another RAT, a distributed base station may have additional radio resources, for example, its own, non-shared radio resources.

As opposed to the case of spectrum sharing between a pair of monolithic base stations, where there are no multiple CU-DU associations in the scenario of a CU-DU base station, only certain DUs under a CU involved in spectrum sharing with a base station of another RAT may be taken into account.

The problem to be solved by the methods in the present disclosure is how to enable inter-RAT radio resource sharing between two base stations, where one of the base stations taking part in the resource sharing consists of a CU and a number of DUs distributed over a wider geographical area.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 5:
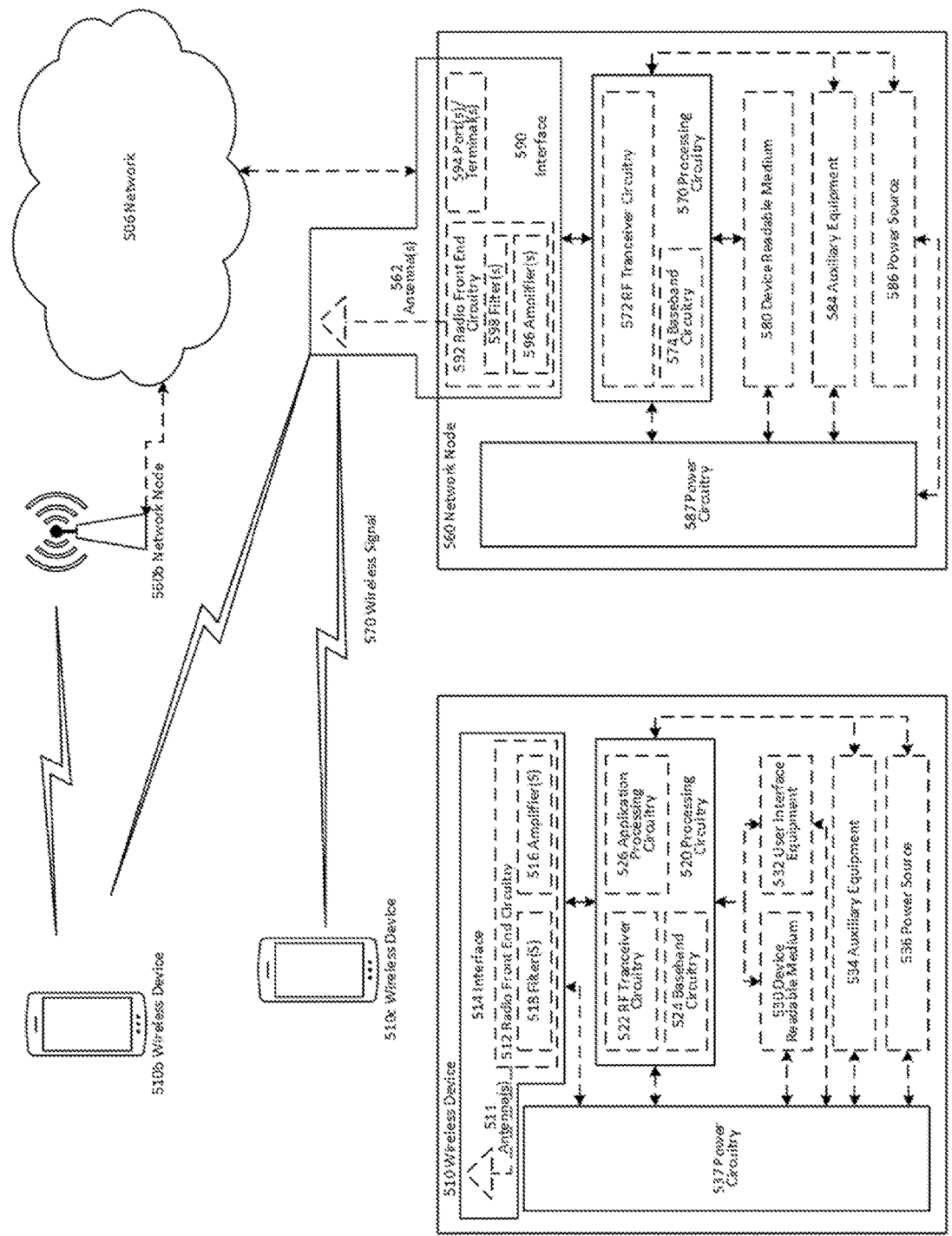
FIG. 5 illustrates an example wireless network, in accordance with certain embodiments.

FIG. 5 is an example wireless network, according to certain embodiments in accordance with certain embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and WDs 510, 510b, and 510c. In practice, a wireless network may further include any additional elements suitable to support communication between wireless devices or between a wireless device and another communication device, such as a landline telephone, a service provider, or any other network node or end device.

Of the illustrated components, network node 560 and wireless device (WD) 510 are depicted with additional detail. In some embodiments, the network node 560 may be a base station which is further depicted in FIGS. 9 and 10. In some embodiments, the network node 560 may be a network node which is further depicted in FIG. 16. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination. In some embodiments, network node 560 may carry out the functions of a CU described with respect to FIG. 15. In some embodiments, network node 560 may carry out the functions of a DU described with respect to FIG. 15.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signaling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionalities described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
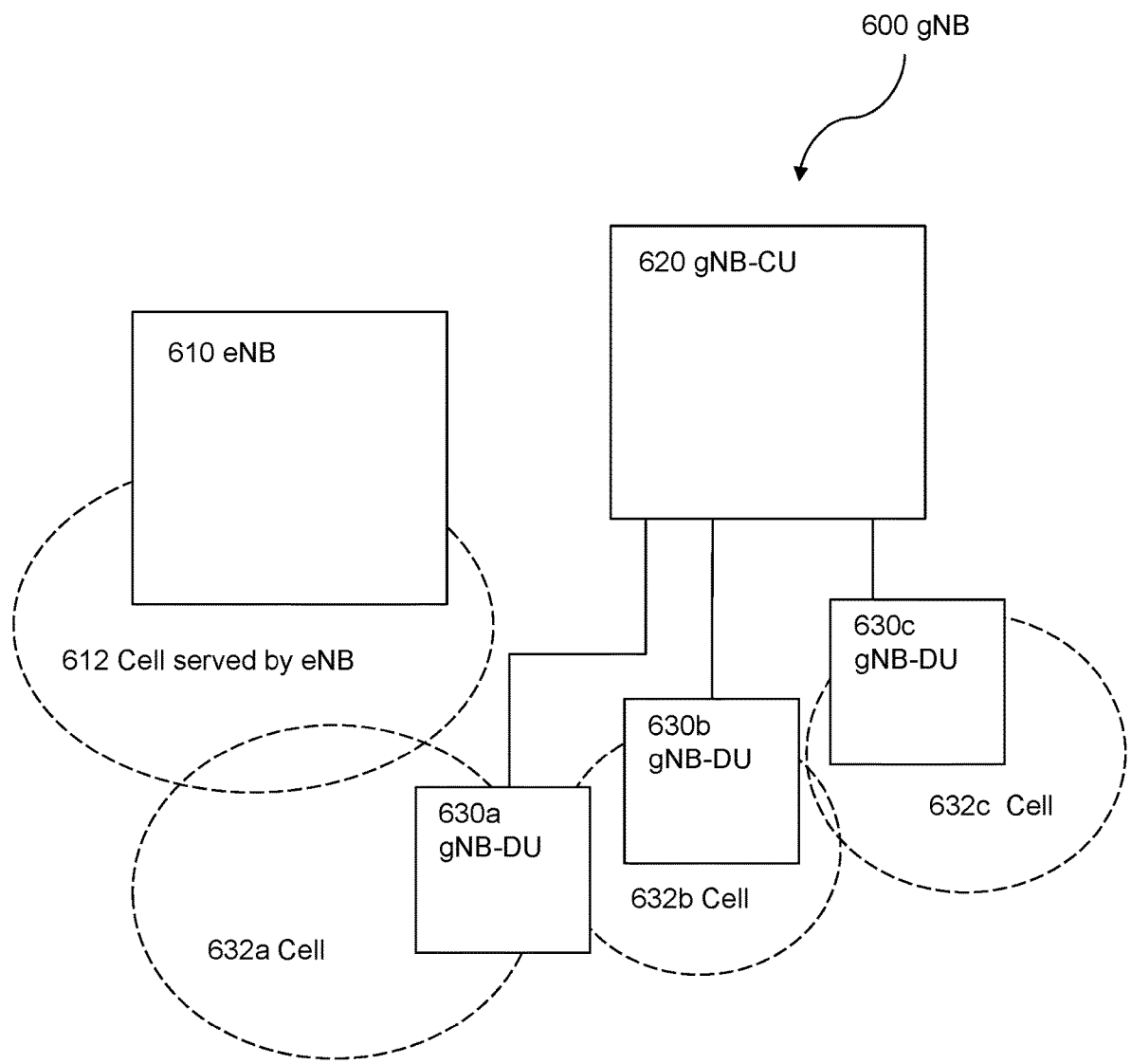
FIG. 6 illustrates an example inter-RAT resource allocation, in accordance with certain embodiments.

FIG. 6 illustrates an example inter-RAT resource allocation between a neighbor LTE network node and distributed units of NR network node, in accordance with certain embodiments.

As a non-limiting example, an LTE eNB 610 is taken as neighbor base station, while an NR gNB 600 is taken as the distributed base station. The gNB 600 is split into a gNB-CU 620 and a number of gNB-DUs 630*a-c*. In certain embodiments, the gNB 600 may be split into a gNB-CU and a gNB-DU.

In one embodiment, the eNB 610 signals resource coordination information to the gNB 600 over an interface such as the X2 or the Xn interface. This information may be represented as a bitmap where each bit corresponds to a time-frequency resource. In certain embodiments, if a bit in the bitmap is set to "1", it means that the resource is utilized by the sending eNB 610, while if the bit is set to "0", it means that the resource is not utilized by the sending eNB 610. The resource allocation is specific to a cell 612 served by the eNB 610. In some embodiments, the information may be represented as an analytical description. The message sent by the eNB 610 to the gNB 600 follows a format that allows the gNB 600 to understand that the resource allocation information is meant to be used for cell level resource coordination between cells sharing the same frequency resources or using frequency resources that are adjacent.

Upon reception of the resource information, the 5G gNB-CU 620 will understand that frequency resource coordination is needed between the 4G eNB cell 612 for which the information was provided and corresponding neighboring cells 632*a-c* at the 5G gNB 600.

The gNB-CU 620 therefore deduces neighbor relations between the eNB cell 612 and cells 632*a-c* of the gNB-DUs 630*a-c* which are connected to the gNB-CU 620. Such neighbor relations might have been previously configured at the gNB 600. In certain embodiments, the neighbor relations might have been gained by means of UE measurements, where served UEs may detect neighbor cells 632*a-c* and report cell identifiers to the serving node 600, hence allowing the construction of a neighbor cell list.

Once the gNB-CU 620 detects the cells 632*a-c* neighboring the eNB cell 612 in question, the gNB-CU 620 will identify the gNB-DUs 630*a-c* serving such cells 632*a-c*. This is known to the gNB-CU 620 by means of opportune previous signaling with connected gNB-DUs 630*a-c*, where gNB-DUs 630*a-c* advertise served cells 632*a-c*.

The gNB-CU 620 may therefore forward the resource allocation information previously received by the eNB 610 to all identified gNB-DUs 630*a-c*.

Upon receiving the eNB cell resource allocation information, each gNB-DU 630*a-c* will calculate the resource allocation that the DU 630*a-c* needs to adopt to serve connected UEs. The DU 630*a-c* will signal such resource allocation in the form of, for example, a bit string, where each bit represents a time-frequency resource, in a way similar to the encoding of resource allocation described above.

The gNB-CU 620 receives resource allocation information from several connected gNB-DUs 630*a-c*. Each resource allocation information relates to a cell 632*a-c* served by one gNB-DU 630*a-c*. The gNB-CU 620, which receives such multitude of resource allocation information per gNB-DU cell 632*a-c* neighboring the eNB's cell 612 in question, will aggregate all such resource allocation information to form one piece of information, for example a bitmap, representing all the time-frequency resources that the involved gNB-DUs 630*a-c* have declared as being allocated. In the example of representing the resource information as a bitmap, the same model described above, where one bit represents a time-frequency resource, may be assumed.

Upon compiling such aggregated resource allocation information, the gNB-CU 620 sends the information to the neighboring eNB 610. The neighboring eNB 610 will therefore use this information to infer the resources that are used by in shared or in adjacent time-frequency resources of the neighboring gNB-DU 630*a-c*. Such information allows the eNB 610 to maintain resource utilization coordination with such gNB-DUs 630*a-c*, e.g. avoiding utilization of the same time-frequency resources at the same time. Alternatively, the information may be used by the eNB 610 to realize that the gNB-DUs 630*a-c* in question have allocated utilization of resources already allocated by the eNB 610. In this case, the eNB 610 may modify its resource allocation and send the updated information back to the gNB-CU 620. At this point, a new round of signaling of such information to the gNB-DUs 630*a-c* and a new round of signaling back of the resource allocation information from gNB-DUs 630*a-c* to the gNB-CU 620 and then back to the eNB 610 will be carried out.

In another embodiment, the gNB-CU 620 may realize, once receiving the resource allocation information from the identified gNB-DUs 630*a-c*, that more than one gNB-DU among the gNB-DUs 630*a-c* intends to use the same set of time-frequency resources. For example, the gNB-CU 620 may therefore determine if the gNB-DUs 630*b-c* serve cells 632*b-c* that are direct neighbors, i.e. cells 632*b-c* that have adjacent coverage. If the gNB-DUs 630*b-c* are direct neighbors, the gNB-CU 620 may decide how to partition resources among such gNB-DUs 630*b-c*. Namely, the gNB-CU 620 may signal to each of the involved gNB-DUs 632*b-c* that a portion of these commonly allocated resources may be used uniquely by one of the involved DUs 632*b-c*. Such procedure may be carried out for different sets of resources and for different gNB-DUs 632*b-c*.

Figure 7:
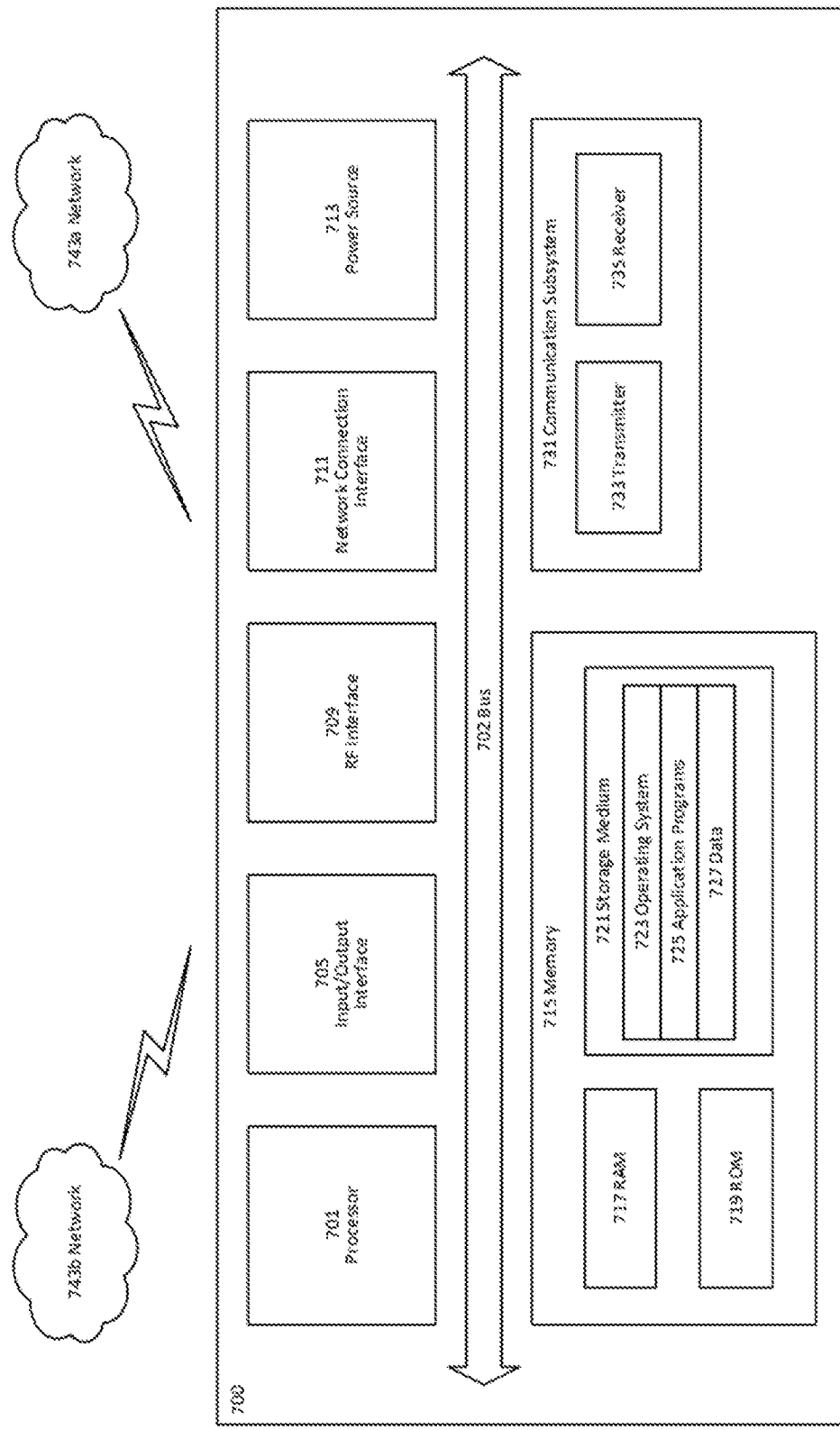
FIG. 7 illustrates an example user equipment, in accordance with certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 700 may be any UE identified by the 3rd Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743a. Network 743a may encompass wired and/or wireless networks such as a local-area network (LAN), a wide-area network (WAN), a computer network, a wireless network, a telecommunications network, another like network or any combination thereof. For example, network 743a may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743b using communication subsystem 731. Network 743a and network 743b may be the same network or networks or different network or networks. Communication subsystem 731 may be configured to include one or more transceivers used to communicate with network 743b. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743b may encompass wired and/or wireless networks such as a local-area network (LAN), a wide-area network (WAN), a computer network, a wireless network, a telecommunications network, another like network or any combination thereof. For example, network 743b may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
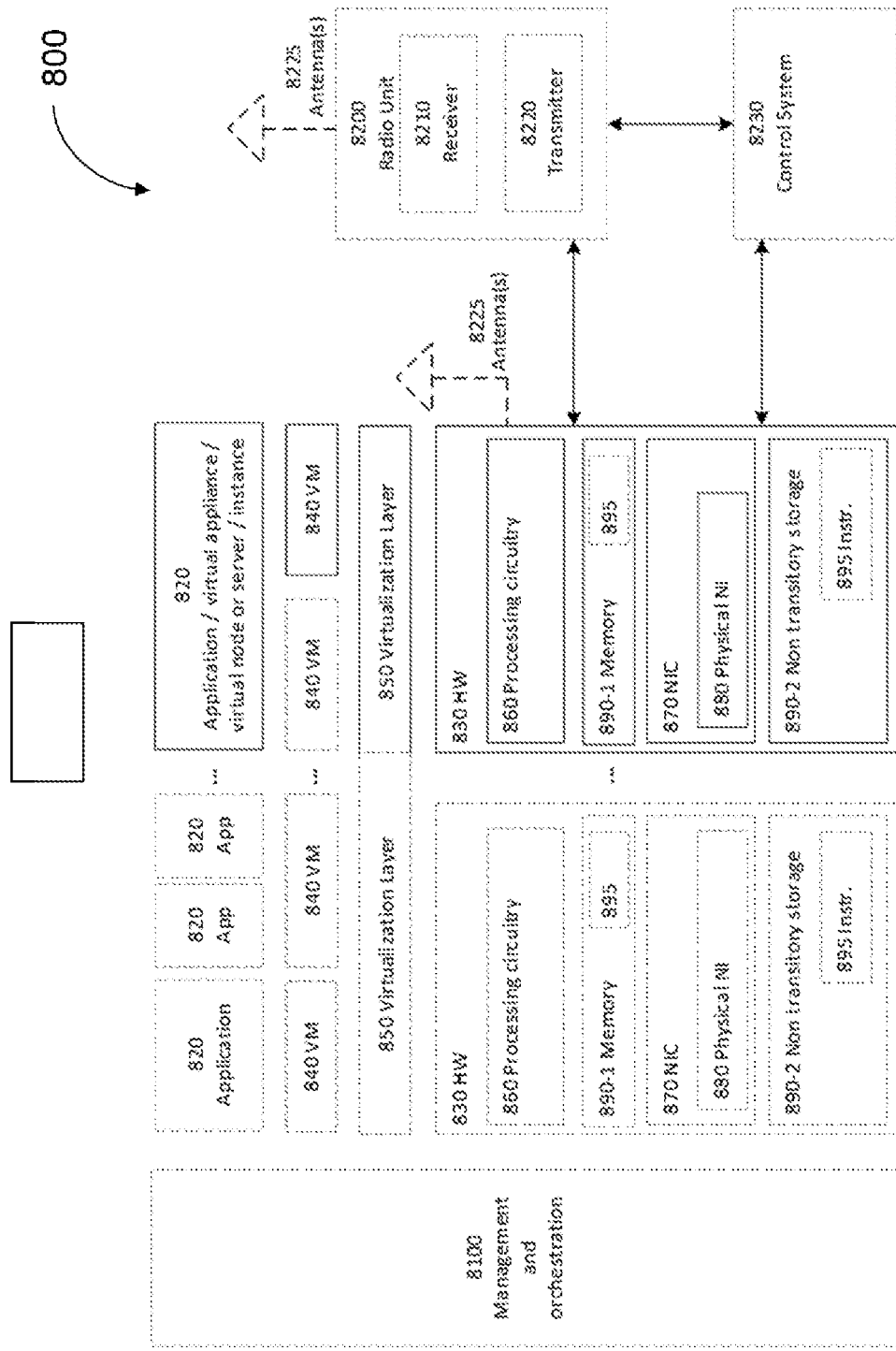
FIG. 8 illustrates an example virtualization environment, in accordance with certain embodiments.

FIG. 8 illustrates an example virtualization environment, according to certain embodiments. FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signaling can be affected with the use of control system 8230 which may alternatively be used for communication between the hardware nodes 830 and radio units 8200.

Figure 9:
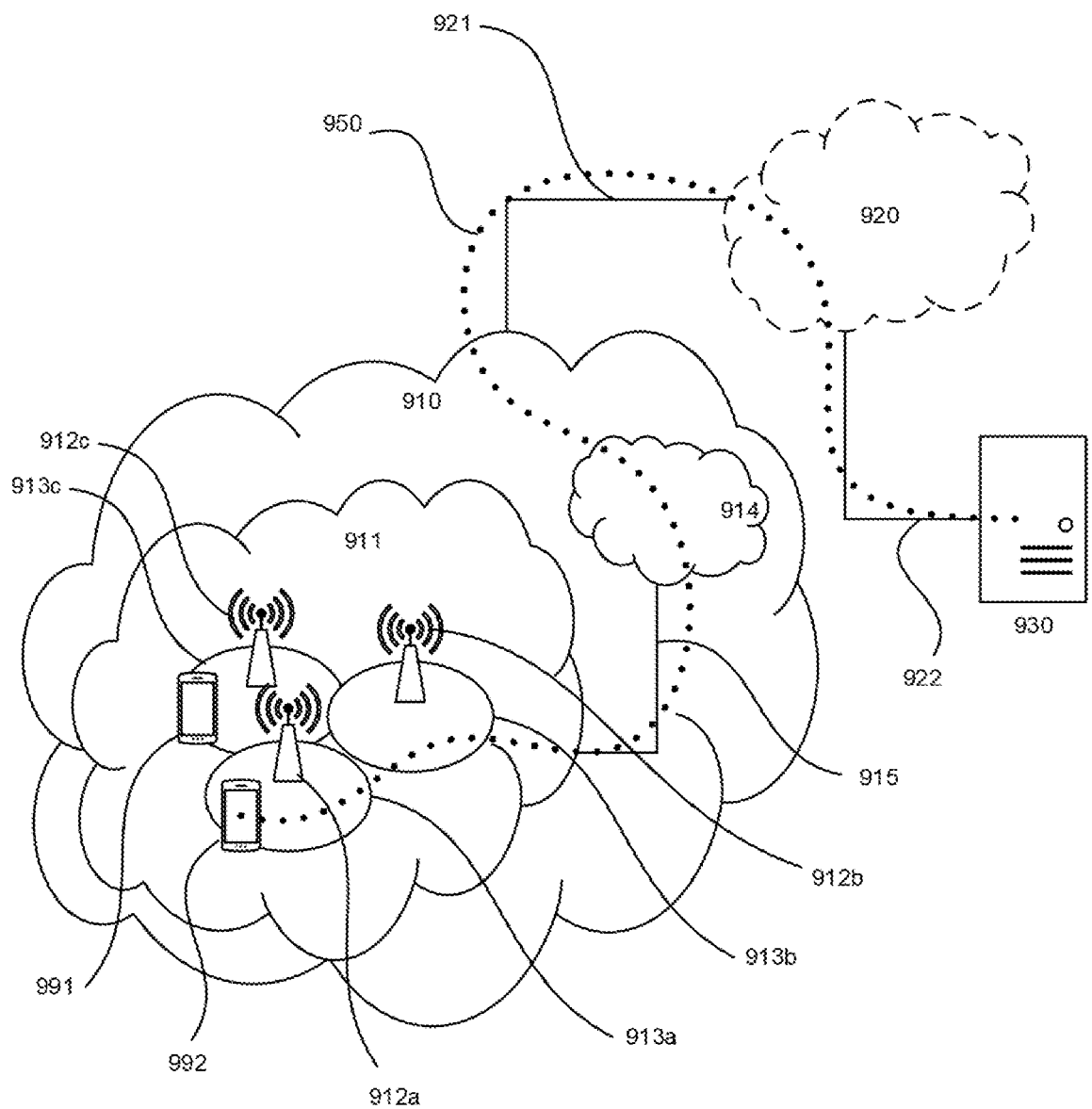
FIG. 9 illustrates an example telecommunication network connected via an intermediate network to a host computer, in accordance with certain embodiments.

FIG. 9 illustrates an example telecommunication network connected via an intermediate network to a host computer, according to certain embodiments. With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912*a*, 912*b*, 912*c*, such as NBs, eNBs, gNBs or other types of wireless access points, each defining a corresponding coverage area 913*a*, 913*b*, 913*c*. In certain embodiments, the plurality of base stations 912*a*, 912*b*, 912*c* may perform the functionality of the CU and the DU(s) as described with respect to FIG. 15. Each base station 912*a*, 912*b*, 912*c* is connectable to core network 914 over a wired or wireless connection 915. A first UE 991 located in coverage area 913*c* is configured to wirelessly connect to, or be paged by, the corresponding base station 912*c*. A second UE 992 in coverage area 913*a* is wirelessly connectable to the corresponding base station 912*a*. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Figure 10:
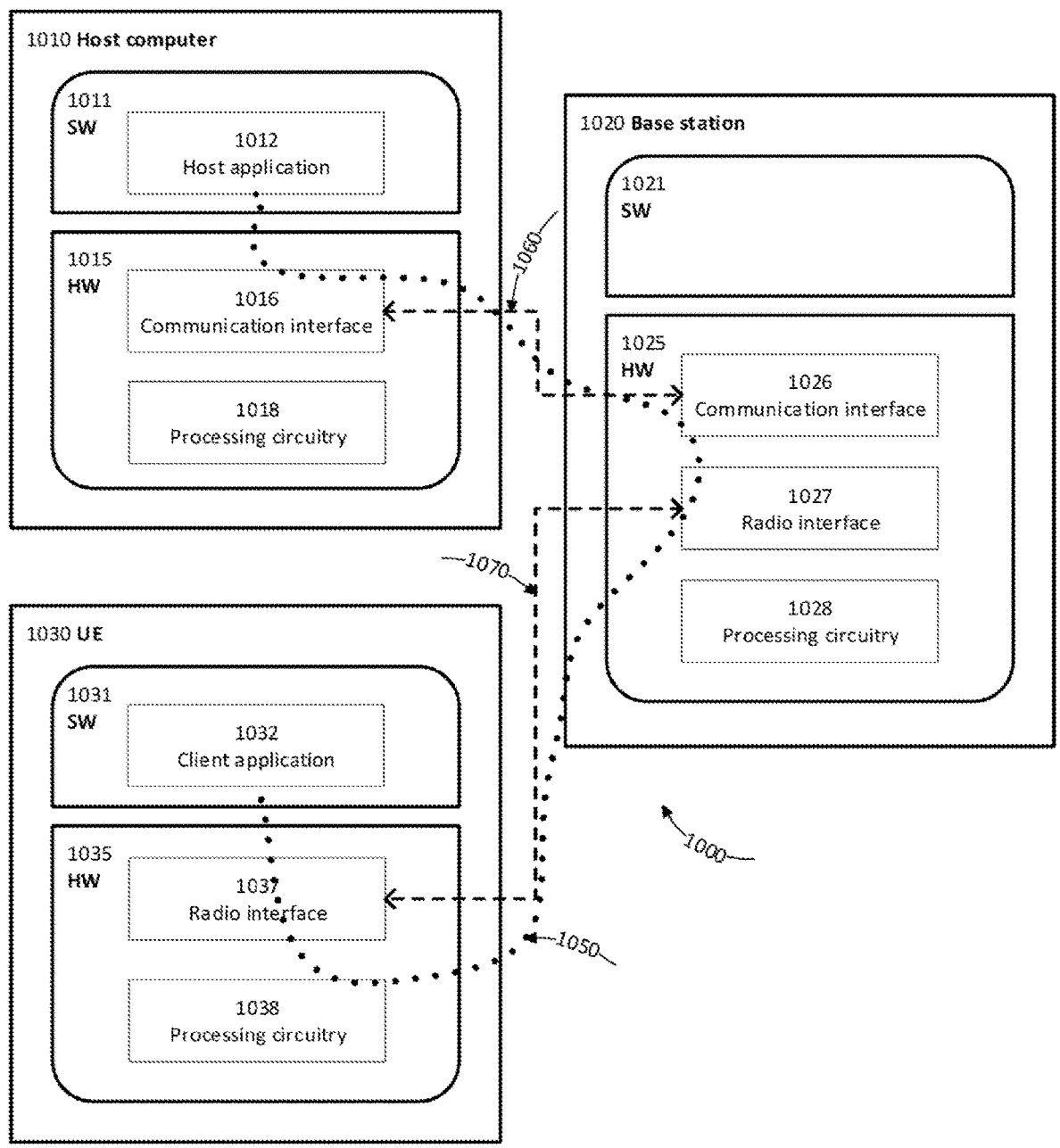
FIG. 10 illustrates an example host computer communicating via a base station with a user equipment over a partially wireless connection, in accordance with certain embodiments.

FIG. 10 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Figure 15:
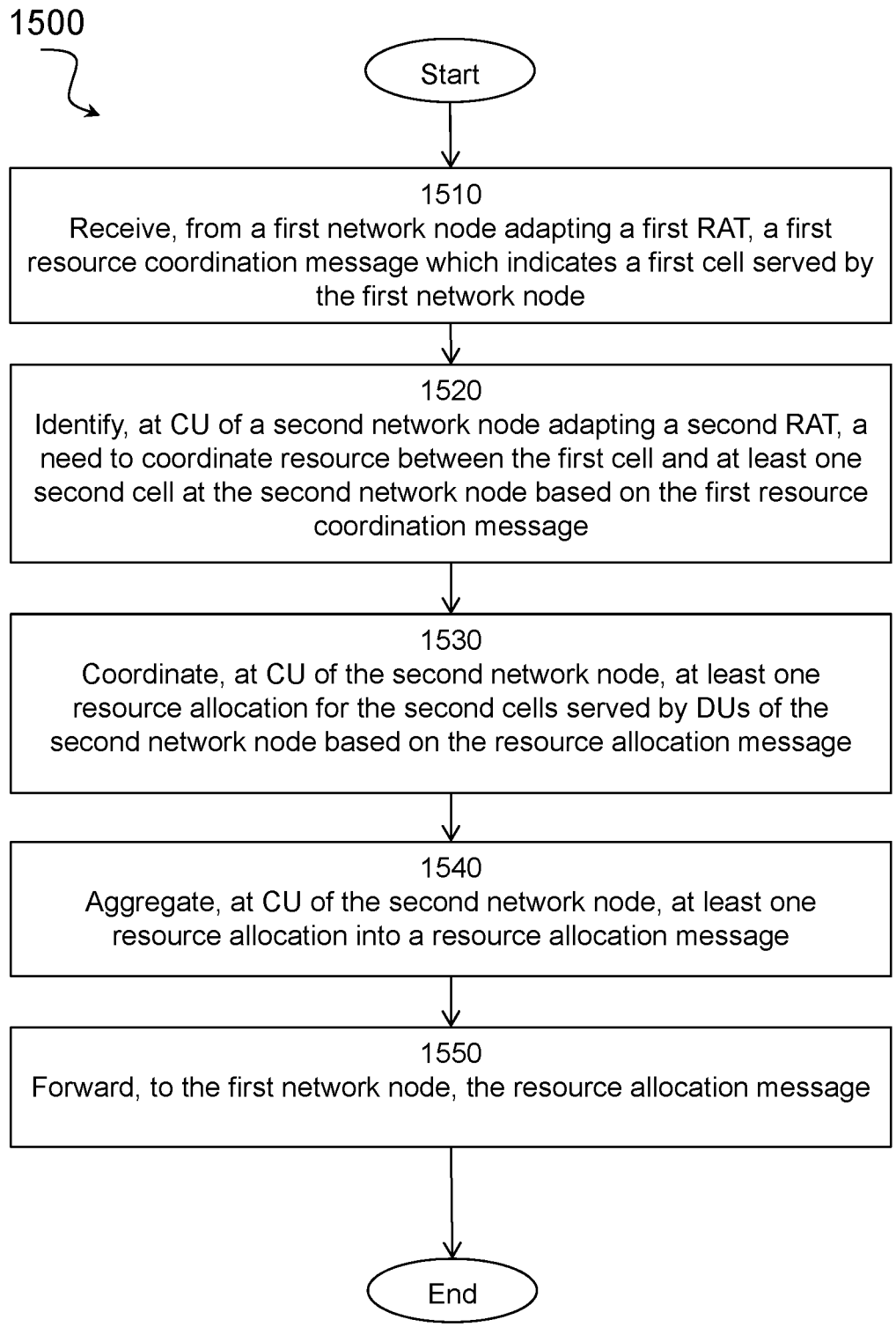
FIG. 15 illustrates a flow diagram of a method in a network node, in accordance with certain embodiments.

Communication system 1000 further includes base station 1020 provided in a telecommunication system and comprising hardware 1025 enabling it to communicate with host computer 1010 and with UE 1030. In certain embodiments, the base station 1020 may be a CU depicted in FIG. 15. In certain embodiments, the base station 1020 may be a DU depicted in FIG. 15. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct, or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. In another embodiment, hardware 1025 of base station 1020 further includes another processing circuitry to perform the functions of a CU. In some embodiments, base station 1020 may comprise a component of CU. Base station 1020 further has software 1021 stored internally or accessible via an external connection. A further description of a base station 1020 in accordance with some embodiments is illustrated in FIG. 15.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
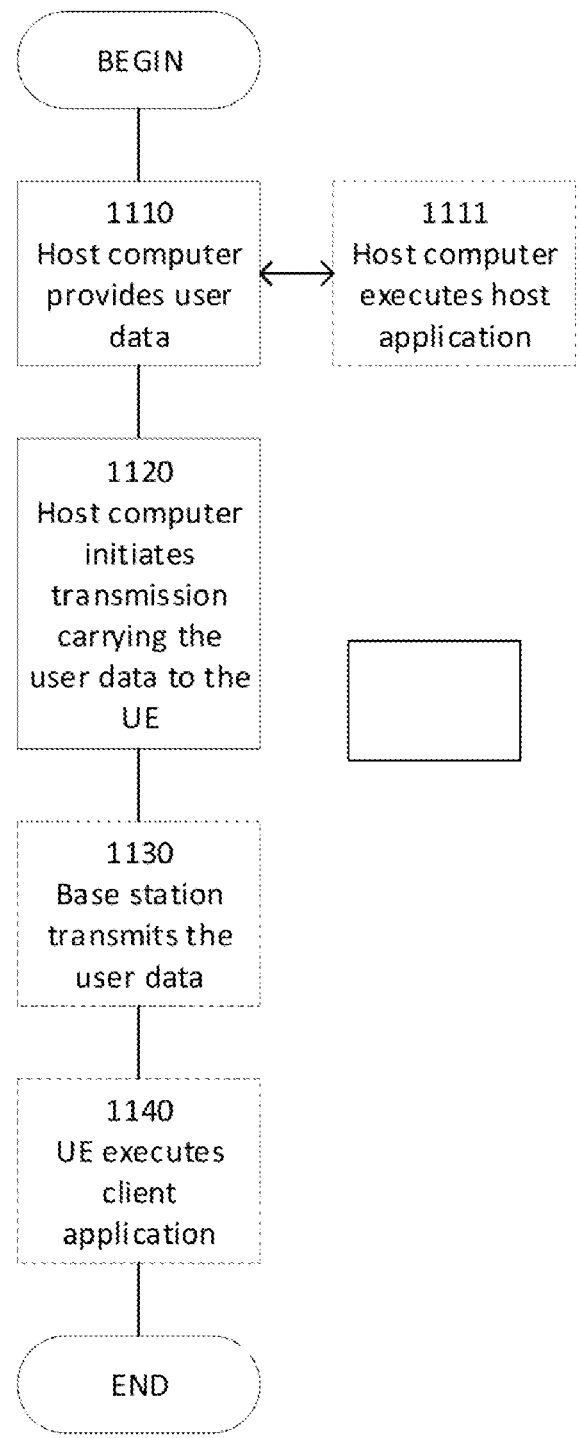
FIG. 11 illustrates an example method implemented in a communication system including a host computer, a base station and a user equipment, in accordance with certain embodiments.

FIG. 11 illustrates an example method implemented in a communication system including a host computer, a base station and a user equipment, according to certain embodiments in accordance with some embodiments. More specifically, FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
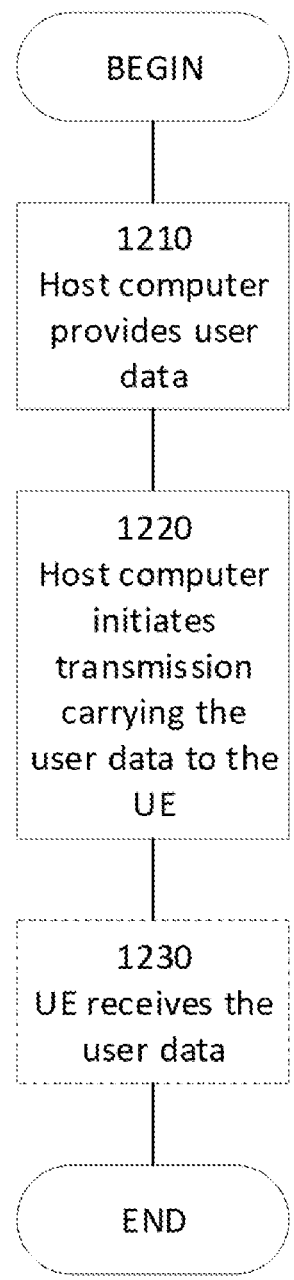
FIG. 12 illustrates another example method implemented in a communication system including a host computer, a base station and a user equipment, in accordance with certain embodiments.

FIG. 12 illustrates an example method implemented in a communication system including a host computer, a base station and a user equipment, in accordance with some embodiments. More specifically, FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
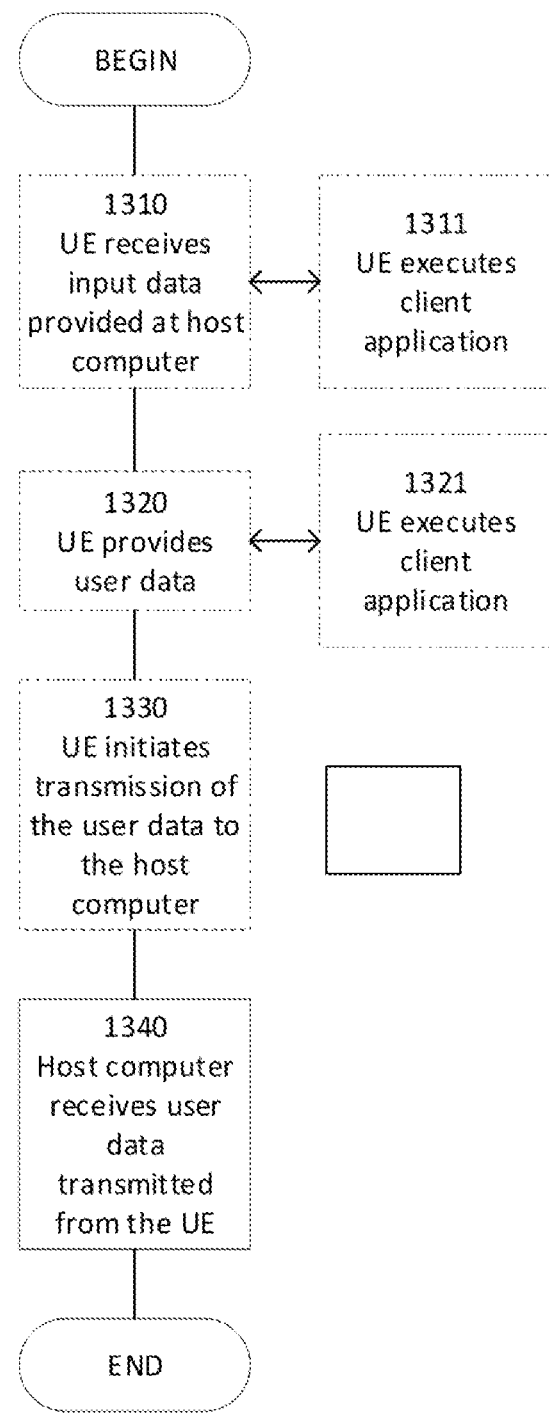
FIG. 13 illustrates another further example method implemented in a communication system including a host computer, a base station and a user equipment, in accordance with certain embodiments.

FIG. 13 illustrates another further example method implemented in a communication system including a host computer, a base station and a user equipment, in accordance with some embodiments. More specifically, FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
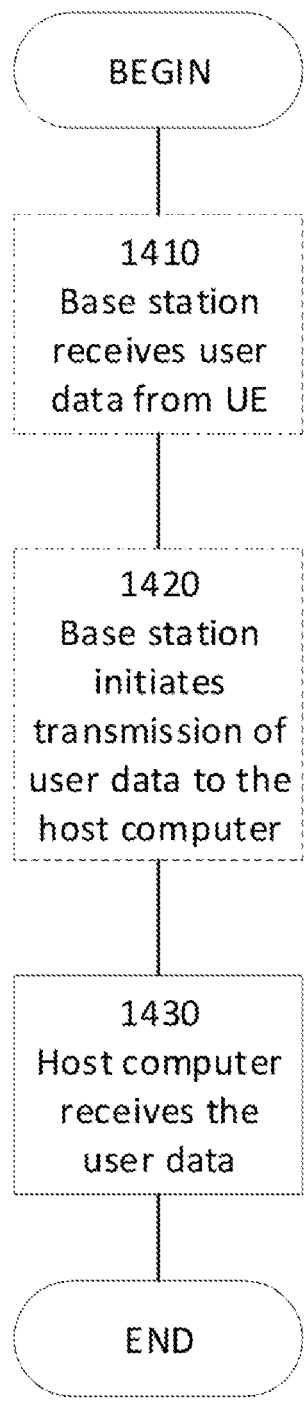
FIG. 14 illustrates another yet example method implemented in a communication system including a host computer, a base station and a user equipment, in accordance with certain embodiments.

FIG. 14 illustrates another example method implemented in a communication system including a host computer, a base station and a user equipment, in accordance with some embodiments. More specifically, FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

FIG. 15 is a flow diagram of a method in a network node, in accordance with certain embodiments. Method 1500 begins at step 1510 with a second network node, receiving a resource coordination message from a first network node. In some embodiments, the resource coordination message indicates a first cell served by the first network node. In some embodiments, the first network node may adapt different RAT than the second network node. In some embodiments, the first network node may adapt Long Term Evolution (LTE) and the second network node may adapt New Radio (NR). In some embodiments, the first network node may be a eNB and the second network node may be a gNB. In some embodiments, the first and second network nodes may be the network node depicted in FIG. 5. In some embodiments, the first and second network nodes may be the base station depicted in FIG. 10. In some embodiments, the second network node may comprise a central unit (CU) and multiple distributed units (DUs) coupled to the CU.

At step 1520, the CU of the second network node identifies a need to coordinate resource between the first cell and multiple second cells served by the DUs at the second network node based on the resource allocation message. In some embodiments, the resource coordination message may indicate that the first cell shares resource with at least one second cell. In some embodiments, the resource coordination message may indicate that the first cell uses resource adjacent to at least one resource used by the second cell. In some embodiments, the resource coordination message may be represented as a bitmap. Each bit in the bitmap may correspond to a time-frequency resource. In some embodiments, the resource coordination message may be represented as an analytical description or any other suitable means to convey the information in the resource coordination message.

At step 1530, the CU of the second network node coordinates at least one resource allocation for the second cells served by DUs of the second network node based on the resource allocation message. In some embodiments, the CU of the second network node may coordinate the resource allocations by deducing neighbor relations between the first cell and the second cells, detecting a neighboring cell which corresponds to the first cell from the at least one second cell, identifying at least one DU in the neighboring cell, forwarding the resource coordination message to the DU in the neighboring cell, and receiving at least one resource allocation calculated by the DU in the neighboring cell based on the resource coordination message. In some embodiments, the resource allocation may indicate a configuration for serving a UE served by the second network node.

At step 1540, the CU of the second network node aggregates at least one resource allocation into a resource allocation message. In some embodiments, the CU of the second network node may aggregate at least two resource allocations into a single resource allocation message. In some embodiments, the resource allocation message may be represented as a bitmap. Each bit in the bitmap corresponds to a time-frequency resource. In some embodiments, the resource allocation message may be represented as an analytical description or any other suitable means to convey the information in the resource allocation message.

At step 1550, the CU of the second network node forwards the resource allocation message to the first network node. In some embodiments, the resource allocation message may comprise an identity of the second cell and an additional cell and the corresponding resource allocations for the second cell and the additional cell. In some embodiments, the CU of the second network node may receive a modification message indicating a modified resource allocation at the first cell from the first network node. The modified resource allocation may be made based on the resource allocation message. In some embodiments, the CU of the second network node may further determine whether any of the second cells at the second network node is a direct neighbor cell to the first cell, and partition resources used by the second network node if there is a second cell at the second network is the direct neighbor cell to the first cell. In some embodiments, after receiving the resource allocation message, the first network node may further identify at least one resource being allocated by the second network node based on the resource allocation message, modify a resource allocation at the first cell based on the resource being allocated by the second network node, and send, to the second network node, a modification message indicating a modification of the resource allocation at the first cell.

Figure 16:
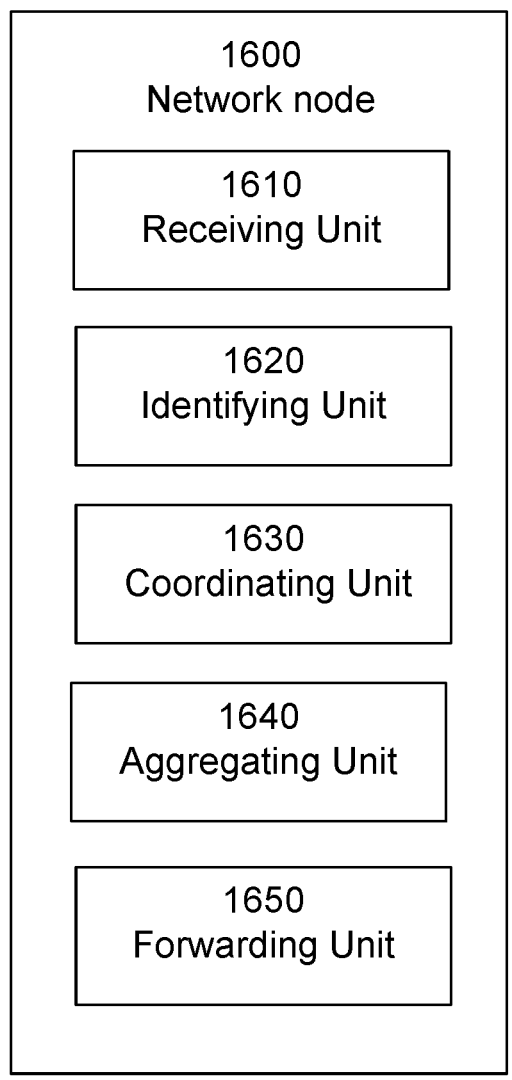
FIG. 16 illustrates a block schematic of an exemplary network node, in accordance with certain embodiments.

FIG. 16 is a schematic block diagram of an exemplary network node, in accordance with certain embodiments. The network node 1600 may be used in a wireless network (for example, the wireless network shown in FIG. 5). The network node 1600 may be implemented in a wireless device (e.g., wireless device 410 shown in FIG. 5). The network node 1600 is operable to carry out the example method described with reference to FIG. 15, and possibly any other processes or methods disclosed herein. It is also to be understood that the method of FIG. 15 is not necessarily carried out solely by the network node 1600. At least some operations of the method can be performed by one or more other entities.

Network node 1600 may comprise processing circuitry, which may include one or more microprocessor or microcontrollers, as well as other digital hardware, which may include digital signal processors (DSPs), special-purpose digital logic, and the like. In some embodiments, the processing circuitry of the network node 1600 may be the processing circuitry 570 shown in FIG. 5. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1610, identifying unit 1620, coordinating unit 1630, aggregating unit 1640, forwarding unit 1650, and any other suitable units of the network node 1600 to perform corresponding functions according one or more embodiments of the present disclosure, such as a transmitter, a receiver, or a processor.

As illustrated in FIG. 16, the network node 1600 includes receiving unit 1610, identifying unit 1620, coordinating unit 1630, aggregating unit 1640, and forwarding unit 1650. The receiving unit 1610 may be configured to receive a resource coordination message from a first network node. In some embodiments, the resource coordination message may indicate a first cell served by the first network node. In some embodiments, the first network node may adapt different RAT than the network node 1600. In some embodiments, the first network node may adapt LTE and the network node 1600 may adapt NR. In some embodiments, the first network node may be a eNB and the network node 1600 may be a gNB. In some embodiments, the first network node and the network node 1600 may be the network node depicted in FIG. 5. In some embodiments, the first network node and the network node 1600 may be the base station depicted in FIG. 10. In some embodiments, the network node 1600 may comprise a CU and multiple DUs coupled to the CU.

The identifying unit 1620 may be configured to identify a need to coordinate resource between the first cell and multiple second cells served by the DUs at the network node 1600 based on the resource allocation message. In some embodiments, the resource coordination message may indicate that the first cell shares resource with at least one second cell. In some embodiments, the resource coordination message may indicate that the first cell uses resource adjacent to at least one resource used by the second cell. In some embodiments, the resource coordination message may be represented as a bitmap. Each bit in the bitmap may correspond to a time-frequency resource. In some embodiments, the resource coordination message may be represented as an analytical description or any other suitable means to convey the information in the resource coordination message.

The coordinating unit 1630 may be configured to coordinate at least one resource allocation for the second cells served by DUs of the network node 1600 based on the resource allocation message. In some embodiments, the CU of the network node 1600 may coordinate the resource allocations by deducing neighbor relations between the first cell and the second cells, detecting a neighboring cell which corresponds to the first cell from the at least one second cell, identifying at least one DU in the neighboring cell, forwarding the resource coordination message to the DU in the neighboring cell, and receiving at least one resource allocation calculated by the DU in the neighboring cell based on the resource coordination message. In some embodiments, the resource allocation may indicate a configuration for serving a UE served by the network node 1600.

The aggregating unit 1640 may be configured to aggregate at least one resource allocation into a resource allocation message. In some embodiments, the aggregating unit 1640 may aggregate at least two resource allocations into a single resource allocation message. In some embodiments, the resource allocation message may be represented as a bitmap. Each bit in the bitmap corresponds to a time-frequency resource. In some embodiments, the resource allocation message may be represented as an analytical description or any other suitable means to convey the information in the resource allocation message.

The forwarding unit 1650 may be configured to forward the resource allocation message to the first network node. In some embodiments, the resource allocation message may comprise an identity of the second cell and an additional cell and the corresponding resource allocations for the second cell and the additional cell. In some embodiments, the network node 1600 may receive a modification message indicating a modified resource allocation at the first cell from the first network node. The modified resource allocation may be made based on the resource allocation message. In some embodiments, the network node 1600 may further determine whether any of the second cells at the second network node is a direct neighbor cell to the first cell, and partition resources used by the second network node if there is a second cell at the second network is the direct neighbor cell to the first cell. In some embodiments, after receiving the resource allocation message, the first network node may further identify at least one resource being allocated by the network node 1600 based on the resource allocation message, modify a resource allocation at the first cell based on the resource being allocated by the network node 1600, and send, to the network node 1600, a modification message indicating a modification of the resource allocation at the first cell.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

According to various embodiments, an advantage of features herein solves the problem of inter-RAT resource sharing for a distributed base station, where the CU gains awareness of which resources are available. That is, the CU learns which resources have been allocated by the neighbor RAT, and determines which of its DUs are neighboring the neighbor RAT base station and its cells for which resource allocation information was signaled. By means of determining that a number of DUs are neighboring the neighbor RAT cell of interest, the CU determines the DUs that are candidates for resource sharing with the neighboring base station. The CU then communicates the information on allocated resources received from the neighbor RAT base station to its associated DUs, which reply with their desired resource allocations. The CU finally collects the desired resource allocations and assembles a complete map of resource allocations including allocated resources for all the involved DUs. This information is signaled to the neighbor base station, which takes the information in to account for further resource coordination iterations.

Another advantage of features herein is that the CU of the network node may not only exchange resource allocation information between network nodes adapting different RATs, but also perform certain actions, such as resource partitioning, to avoid a potential interference between network nodes using the same or adjacent resources.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for resource sharing comprising:
receiving, from a first network node adapting a first radio access technology (RAT), a resource coordination message which indicates a first cell served by the first network node;
coordinating, at a second network node adapting a second RAT, at least one resource allocation for at least one second cell served by the second network node based on the resource coordination message;
aggregating, at the second network node, the at least one resource allocation with at least one additional resource allocation associated with at least one additional cell into a resource allocation message; and
forwarding, to the first network node, the resource allocation message, the resource allocation message comprising an identity of the second cell and the at least one additional cell and the corresponding resource allocations for the second cell and the at least one additional cell.

2. The method according to claim 1, wherein the first and second network nodes comprise a central unit (CU) and at least one distributed unit (DU) coupled to the CU.

3. The method according to claim 2, wherein the coordinating further comprises:
identifying, at the CU of the second network node, a need to coordinate resources between the first cell, the at least one second cell, and the at least one additional cell;
deducing, at the CU of the second network node, neighbor relations between the first cell, the at least one second cells, and the at least one additional cell;
detecting, at the CU of the second network node, a neighboring cell which corresponds to the first cell from the at least one second cell and the at least one additional cell;
identifying, at the CU of the second network node, at least one DU in the neighboring cell;
forwarding, from the CU to the at least one DU in the neighboring cell, the resource coordination message;
calculating, at the at least one DU in the neighboring cell, the at least one resource allocation based on the resource coordination message; and
receiving, from the at least one DU in the neighboring cell at the CU, the at least one resource allocation.

4. The method according to claim 1, wherein the first cell shares at least one resource with the at least one second cell or the at least one additional cell or uses at least one resource which is adjacent to at least one resource used by the at least one second cell or the at least one additional cell.

5. The method according to claim 1, wherein the resource coordination message and the resource allocation message are represented as a bitmap, wherein each bit in the bitmap corresponds to a time-frequency resource.

6. The method according to claim 1, wherein the at least one resource allocation and the at least one additional resource allocation indicate a configuration for serving a user equipment (UE) served by the second network node.

7. The method according to claim 1, further comprising receiving, from the first network node at the second network node, a modification message indicating a modified resource allocation at the first cell.

8. The method according to claim 1, further comprising:
determining, at the second network node, whether any of the at least one second cell and the at least one additional cell at the second network node is a direct neighbor cell to the first cell; and
partitioning, at the second network node, resources used by the second network node if any of the at least one second cell and the at least one additional cell at the second network is the direct neighbor cell to the first cell.

9. The method according to claim 3, wherein the neighbor relations are previous neighbor relations configured at the second network node or are gained by UE measurements.

10. The method according to claim 1, wherein the first RAT is Long Term Evolution (LTE) and the second RAT is New Radio (NR).

11. The method according to claim 1, wherein the first and second RATs are NR.

12. A network node for resource sharing comprising:
at least one processing circuitry; and
at least one storage that stores processor-executable instructions, when executed by the processing circuitry, causes a network node adapting a first radio access technology (RAT) to:
receive, from a first network node adapting a second RAT, a resource coordination message which indicates a first cell served by the first network node;
coordinate at least one resource allocation for at least one second cell served by the network node based on the resource coordination message;
aggregate the at least one resource allocation with at least one additional resource allocation associated with at least one additional cell into a resource allocation message; and
forward, to the first network node, the resource allocation message, the resource allocation message comprising an identity of the second cell and the at least one additional cell and the corresponding resource allocations for the second cell and the at least one additional cell.

13. The network node according to claim 12, wherein the network node and the first network node comprise a central unit (CU) and at least one distributed unit (DU) coupled to the CU.

14. The network node according to claim 13, wherein the step to coordinate further comprises:
identifying, at the CU of the network node, a need to coordinate resources between the first cell, the at least one second cell, and the at least one additional cell;
deducing, at the CU of the network node, neighbor relations between the first cell, the at least one second cells, and the at least one additional cell;
detecting, at the CU of the network node, a neighboring cell which corresponds to the first cell from the at least one second cell and the at least one additional cell;
identifying, at the CU of the network node, at least one DU in the neighboring cell;
forwarding, from the CU to the at least one DU in the neighboring cell, the resource coordination message;
calculating, at the at least one DU in the neighboring cell, the at least one resource allocation based on the resource coordination message; and
receiving, from the at least one DU in the neighboring cell at the CU, the at least one resource allocation.

15. The network node according to claim 12, wherein the first cell shares at least one resource with the at least one second cell or the at least one additional cell or uses at least one resource which is adjacent to at least one resource used by the at least one second cell or the at least one additional cell.

16. The network node according to claim 12, wherein the resource coordination message and the resource allocation message are represented as a bitmap, wherein each bit in the bitmap corresponds to a time-frequency resource.

17. The network node according to claim 12, wherein the at least one resource allocation and the at least one additional resource allocation indicate a configuration for serving a user equipment served by the network node.

18. The network node according to claim 12, wherein the instructions further cause the network node to receive, from the first network node, a modification message indicating a modified resource allocation at the first cell.

19. The network node according to claim 12, wherein the instructions further cause the network node to:
determine whether any of the at least one second cell and the at least one additional cell at the network is a direct neighbor cell to the first cell; and
partition resources used by the network node if any of the at least one second cell and the at least one additional cell at the network is the direct neighbor cell to the first cell.

20. The network node according to claim 14, wherein the neighbor relations are previous neighbor relations configured at the network node or are gained by UE measurements.

21. The network node according to claim 12, wherein the first RAT is New Radio (NR) and the second RAT is Long Term Evolution (LTE).

22. The network node according to claim 12, wherein the first and second RATs are NR.

23. A communication system for resource sharing, the communication system comprising:
a first network node which adapts a first radio access technology (RAT) comprising at least one processing circuitry configured to:
send, to a second network node, a resource coordination message which indicates a first cell served by the first network node;
the second network node which adapts a second RAT comprising at least one processing circuitry configured to:
receive, from the first network node, the resource coordination message;
coordinate at least one resource allocation for at least one second cell served by the second network node based on the resource coordination message;
aggregate the at least one resource allocation with at least one additional resource allocation associated with at least one additional cell into a resource allocation message; and
forward, to the first network node, the resource allocation message, the resource allocation message comprising an identity of the second cell and the at least one additional cell and the corresponding resource allocations for the second cell and the at least one additional cell; and
the first network node further configured to:
receive, from the second network node, the resource allocation message;
identify at least one resource being allocated by the second network node based on the resource allocation message;
modify a resource allocation at the first cell based on the at least one resource being allocated by the second network node; and
send, to the second network node, a modification message indicating a modification of the resource allocation at the first cell.

* * * * *